May 5, 1953

N. A. MOERMAN 2,637,810

ELECTRONIC PULSE GENERATOR

Filed Nov. 12, 1948

INVENTOR.
NATHAN A. MOERMAN
BY
Alfred W. Barber
ATTORNEY

Patented May 5, 1953

2,637,810

UNITED STATES PATENT OFFICE 2,637,810

ELECTRONIC PULSE GENERATOR

Nathan A. Moerman, Jackson Heights, N. Y., assignor to Potter Instrument Co., Inc., Great Neck, N. Y., a corporation of New York Application November 12, 1948, Serial No. 59,621

2 Claims. (Cl. 250—27)

1

The present invention concerns electronic circuits and, in particular, electronic pulse generating devices.

If two thyratrons are connected with their control grids and cathodes in parallel, separate storage capacitors to their plates and a common cathode resistor, a pulse applied to the control grids will cause one of the thyratrons to fire. Only one will fire due to slight differences in characteristics and due to the instantaneous discharge of the corresponding plate capacitor through the common cathode resistor placing a cutoff bias on the other thyratron. If the time constant of the plate capacitor and cathode resistor is short enough, the cutoff bias will dissipate before the grid pulse passes and the second thyratron will fire.

Since the time interval between the firing of the two thyratrons is determined by the time constant of the plate capacitor and the cathode resistor a device capable of generating two accurately spaced sharp pulses is available. Such a device is useful, for instance, for determining the resolution of electronic counting devices.

This same characteristic of a thyratron circuit may be used to accomplish another useful result. It may be desirable to count random pulses from a number of sources some or all of which may coincide. Several thyratrons may be connected through a common cathode resistor with their control grids connected to different pulse sources. If several pulses occur at the same time only one thyratron will fire initially generating a pulse which may be passed from the common cathode resistor to an electronic counter to represent the pulse on its grid. As soon as the cathode voltage drops to a low value, another thyratron will fire passing another pulse to the counter and so on until all the pulses from the various sources have been counted. Short pulses from the sources may be lengthened by suitable integrating means to cause them to last long enough for all pulses to be counted in the above manner.

One object of the present invention is to provide a method of and means for generating two or more pulses at predetermined time intervals.

Another object is to generate separated pulses in response to coinciding pulses.

Still another object is to provide means for accurately counting pulses even though some of them may occur at the same instant.

These and other objects of the present invention will be apparent from the detailed description of the invention given in connection with the various figures of the drawing.

2

Figure 1:
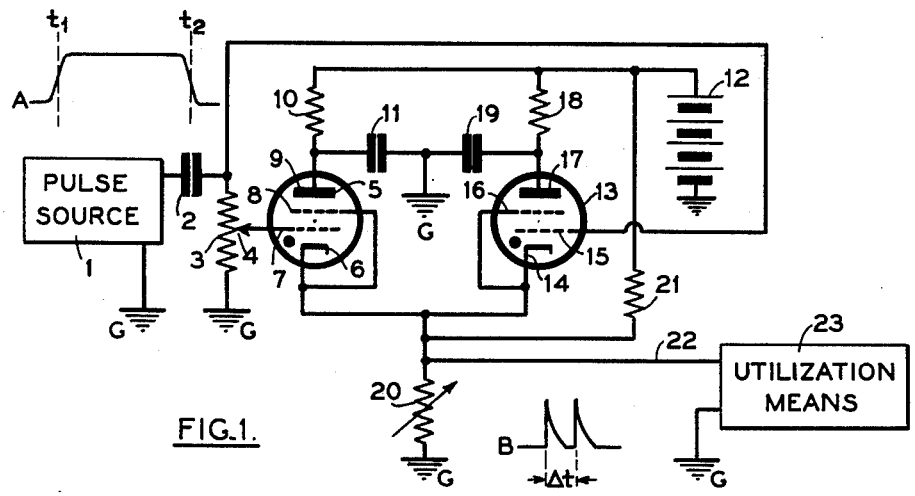
Fig. 1 shows a circuit diagram of one form of the present invention.

Fig. 1 shows a circuit embodying one form of the present invention. A pulse source 1, which may be taken to represent any suitable source of pulses of the general form shown at A, is coupled to a thyratron 5 through capacitor 2 and across at least a portion of potentiometer 3. The thyratron 5 has a cathode 6 heated by any suitable means, not shown, suppressor grid 8, control grid 7 and plate 9. Source 1, is also coupled to a second thyratron 13 through capacitor 2. Thyratron 13 is similar to thyratron 5 having cathode 14 heated by suitable means, not shown, control grid 15, suppressor grid 16, and plate 17. Plate 9 is connected through resistor 10 to a suitable source of plate voltage such as battery 12 while plate 17 is connected through resistor 18 equal to resistor 10 to this source of voltage. Capacitor 11 is connected from plate 9 to ground G and an equal capacitor 19 is connected from plate 17 to ground G. Cathodes 6 and 14 are connected together and through a common cathode resistor 20 to ground G which may be variable as indicated. In order to establish a suitable initial bias on the two thyratrons any suitable means may be used as, for instance, a bias derived from current flowing from battery 12 through resistor 21 to the cathode end of resistor 20. Pulses generated across resistor 20 may be utilized in any desired manner by utilization means 23 connected by means of lead 22.

In operation, a pulse is applied from source 1 to both thyratron grids. While both thyratrons have the same applied voltages and are similar, one will fire first due to inevitable slight differences in their operating characteristics. Assume, for instance, that thyratron 13 fires first. When it fires, capacitor 19, which has been charged through resistor 18 to the full voltage of battery 12, discharges through resistor 20 generating a considerable bias. This bias keeps thyratron 5 from firing until the voltage across resistor 20 has dropped to a low value. When the voltage across resistor 20 has dropped to a low value, thyratron 5 will fire discharging capacitor 11 through resistor 20. The discharge of capacitors 19 and 11 will generate two sharp pulses as shown at B. These pulses, as shown at B, will be separated by a time $dt$. This time will be determined by the time constant determined by capacitors 19 or 11 and resistor 20. Thus, by making resistor 20 variable, the pulse separation time $dt$ may be varied and controlled. Another adjustment of time $dt$ may be provided by varying the amount of the pulse voltage applied to grid 7 by adjusting variable contact 4 of potentiometer 3. This adjustment may be used to insure that thyratron 13 will fire first and it will vary the time between pulses by requiring a further decay of voltage across resistor 20 before thyratron 5 fires.

The above described circuit is useful where it is desired to generate two sharp pulses separated by a small known time. The utilization means, for instance, may be an electronic counter for which the minimum resolution time is to be determined. The time $dt$ is reduced until the counter fails to register two counts for the two pulses across resistor 20. The grid pulse, shown at A must have a duration from $t_1$ to $t_2$ substantially greater than the maximum $dt$ to be generated so that the two thyratrons can be fired in succession from a single grid pulse.

Figure 2:
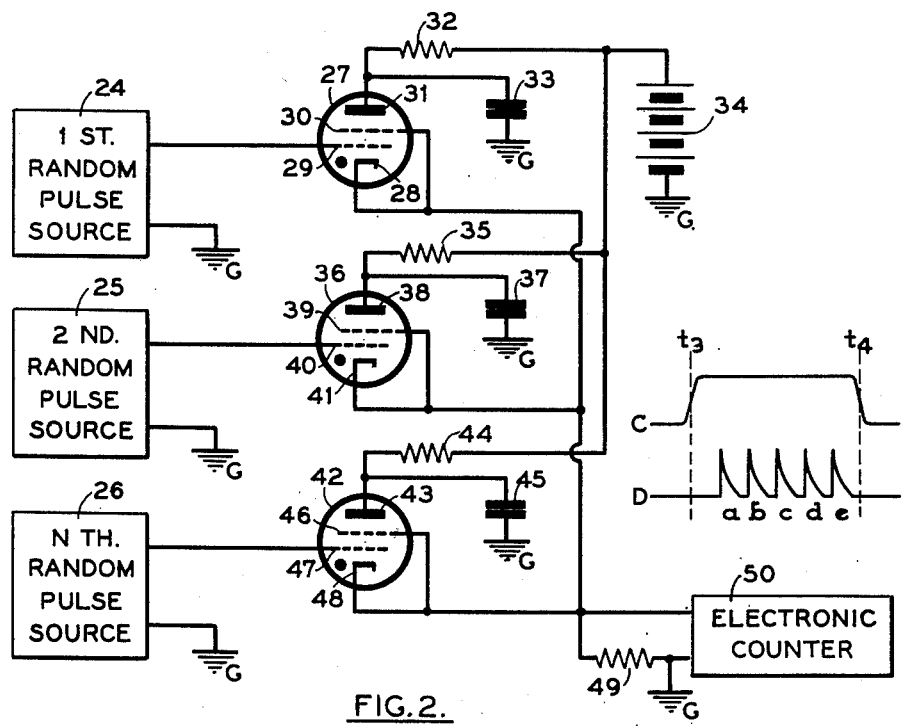
Fig. 2 shows a circuit diagram of another form of the present invention.

Fig. 2 shows a circuit illustrating a modified form of the present invention. A plurality of thyratrons are connected to a common cathode resistor so that only one will fire at a time. The grids are connected to a plurality of pulse sources. An output pulse across the common cathode resistor will be generated for each grid pulse even if the grid pulses all occur at the same instant. When the output pulses are applied to an electronic counter, the circuit provides a means for accurately counting random pulses regardless of how they occur in time.

Fig. 2 shows a plurality of thyratrons, for purposes of illustration three, including thyratrons 27, 36 and 42 with their cathodes 28, 41 and 48 respectively connected to a common resistor 49. Thyratrons 27, 36 and 42 have cathodes 28, 41 and 48, control grids 29, 40 and 47, suppressor grids 30, 39 and 46, and plates 31, 38 and 43 respectively. Plates 31, 38 and 43 are connected through resistors 32, 35 and 44 respectively to voltage source 34 and through charge storage capacitors 33, 37 and 45 respectively to ground G. Suppressor grids 30, 39 and 46 are connected to their respective cathodes. A 1st source of random pulses 24 is connected to grid 29, a 2nd source of random pulses 25 is connected to grid 40, and a 3rd source of random pulses is connected to grid 47. An output utilization means consisting of an electronic counter 50 is connected across common cathode resistor 49.

In operation, if a pulse from source 24 reaches grid 29, thyratron 27 breaks down and discharges capacitor 33 through resistor 49 thereby generating a single sharp pulse which is passed on to counter 50 where it registers a count. Although this output pulse takes place in a fraction of the time of the duration of the grid pulse, the thyratron fires only once for each grid pulse. After it has fired and generated an output pulse it remains conducting as long as the pulse continues on its grid. When the grid pulse drops to a low enough value the thyratron goes out permitting capacitor 33 to recharge ready for another cycle.

Similarly a pulse from source 25 on grid 40 causes thyratron 36 to break down or ignite discharging capacitor 37 through resistor 49 thereby registering a count in counter 50 and a pulse from source 26 on grid 47 causes thyratron 42 to break down discharging capacitor 45 through resistor 49 and registering another count in counter 50. Capacitors 37 and 45 are recharged from voltage source 34 through resistors 35 and 44 respectively.

If two or more pulses from sources 24, 25 and 26 occur at the same or substantially the same time, one of thyratrons 27, 36 and 42 will fire generating and output pulse and at the same time preventing either of the other thyratrons from firing until the first capacitor has dissipated its charge. Then a second thyratron will fire generating an output pulse representing its grid pulse and blocking the third thyratron. When the second discharge has been completed, the third thyratron fires generating a third pulse. Thus three grid pulses, even though they coincide in time, generate and pass on to the counter three output pulses which the counter is able to resolve and count.

At C is shown a pulse from $t_3$ to $t_4$ which may represent a plurality of coinciding grid pulses. In a system having five sources, C would then represent five grid pulses. The successive firing of the five thyratrons in such a system would generate the five separated pulses, D represented by $a$, $b$, $c$, $d$ and $e$.

While only two forms of the present invention have been shown and described, many modifications will be apparent to those skilled in the art and within the spirit and scope of the invention as set forth in the appended claims.

What is claimed is:

1. In a device for generating distinctly spaced pulses in response to overlapping or concurrent pulses, the combination of, at least two gaseous discharge tubes each including at least a plate, a grid and a cathode, a capacitor connected in shunt with each of said plates, a resistor connected in series with each of said plates, a source of direct current voltage connected to said resistors for charging said capacitors at a predetermined rate through said resistors, an impedance common to at least two of said cathodes to provide a bias to prevent the firing of either of said tubes during the firing of the other, and circuits for connecting said grids to at least two different sources of substantially concurrent pulses for firing said tubes at different instants to provide spaced pulses across the last said impedance.

2. In a device for counting concurrent pulses, the combination of, a plurality of gaseous discharge tubes each including at least a plate, a cathode and a grid, a capacitor connected in shunt with each of said plates, a resistor connected in series with each of said plates, a source of voltage for charging said capacitors through said resistors, an impedance common to all of said cathodes for developing an output pulse upon the discharge of any of said capacitors through its connected plate and for preventing the firing of all of said tubes but one at any given instant, circuits for connecting said grids to a plurality of different sources of random pulses to be counted for firing said tubes at different instants to provide distinct pulses across said last said impedance.

NATHAN A. MOERMAN.

References Cited in the file of this patent

UNITED STATES PATENTS

| Number | Name | Date |
|---|---|---|
| 2,350,888 | Hall | June 6, 1944 |
| 2,402,169 | Lifschutz | June 18, 1946 |
| 2,473,432 | Johnston | June 14, 1949 |

FOREIGN PATENTS

| Number | Country | Date |
|---|---|---|
| 134,942 | Austria | Oct. 10, 1933 |

OTHER REFERENCES

"A Vacuum Tube Circuit for Scaling Down Counting Rates" by Stevenson et al.; Review of Scientific Instruments, vol. 8, November 1937, pages 414 to 416.